US012662384B2

(12) United States Patent
Lee et al.

(10) Patent No.: US 12,662,384 B2
(45) Date of Patent: Jun. 23, 2026

(54) NEUTRON ABSORBER SYNTHESIS SYSTEM

(71) Applicant: KOREA ATOMIC ENERGY RESEARCH INSTITUTE, Daejeon (KR)

(72) Inventors: Kirak Lee, Daejeon (KR); Hwan Seo Park, Daejeon (KR); JungHoon Choi, Daejeon (KR); Hyun Woo Kang, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 1140 days.

(21) Appl. No.: 17/467,513

(22) Filed: Sep. 7, 2021

(65) Prior Publication Data

US 2022/0185679 A1 Jun. 16, 2022

(30) Foreign Application Priority Data

Dec. 16, 2020 (KR) ........................ 10-2020-0176529

(51) Int. Cl.
*C01B 32/991* (2017.01)
*B01J 19/12* (2006.01)
(Continued)

(52) U.S. Cl.
CPC ........... *C01B 32/991* (2017.08); *B01J 19/126* (2013.01); *B01J 19/14* (2013.01); *B01J 2219/00141* (2013.01); *G21C 7/24* (2013.01)

(58) Field of Classification Search
CPC ....... C01B 32/991; B01J 19/126; B01J 19/14; B01J 2219/00141; G21C 7/24
(Continued)

(56) References Cited

U.S. PATENT DOCUMENTS 4,505,787 A * 3/1985 Fuller .................. C01B 32/935 423/442
4,793,983 A * 12/1988 Wieczorek ................ G21F 9/30 423/2

(Continued)

FOREIGN PATENT DOCUMENTS

CN 102584018 7/2012
CN 107983101 A * 5/2018 ............. B01D 53/22

(Continued)

OTHER PUBLICATIONS

Kocakusak et. al, "Production of anhydrous, crystalline boron oxide in fluidized bed reactor." Chem. Eng. And Proc.: Proc. Int., 35, 4, 311-317 (1996) (Year: 1996).*

(Continued)

*Primary Examiner* — James Lin
*Assistant Examiner* — John Lee
(74) *Attorney, Agent, or Firm* — LEX IP MEISTER, PLLC

(57) ABSTRACT

A neutron absorber synthesis system that can synthesize boron carbide that is a raw material for a neutron absorber, by recycling boron (B-10) of a mass number 10 that can absorb boron, particularly neutrons existing in boric acid waste fluid, is provided. The neutron absorber synthesis system includes: a pre-processing unit to which a radioactive waste including boron is supplied from the outside and inflows to the inside and a compound is produced by removing moisture of the radioactive waste by heat treatment by a first heat source; and a boron carbide synthesizing unit to which the compound produced from the radioactive waste is inflowed inside and a boron carbide is synthesized from a raw material containing the compound and carbon by heat treatment by a second heat source.

14 Claims, 5 Drawing Sheets

(51) Int. Cl.
*B01J 19/14* (2006.01)
*G21C 7/24* (2006.01)

(58) Field of Classification Search
USPC .................................................... 204/157.6
See application file for complete search history.

(56) References Cited

U.S. PATENT DOCUMENTS

| | | | | | |
|---|---|---|---|---|---|
| 5,338,523 | A | * | 8/1994 | Krstic | C01B 32/991<br>51/307 |
| 5,457,266 | A | | 10/1995 | Bege et al. | |

FOREIGN PATENT DOCUMENTS

| | | | | | |
|---|---|---|---|---|---|
| CN | 109399636 | A | * | 3/2019 | |
| CN | 110391034 | A | * | 10/2019 | G21F 9/12 |
| CN | 111924846 | A | * | 11/2020 | |
| FR | 2608308 | | | 6/1988 | |
| GB | 898403 | | | 6/1962 | |
| JP | 4152562 | | | 9/2008 | |
| KR | 10-1991-005732 | | | 8/1991 | |
| KR | 10-1994-7003567 | | | 10/1994 | |
| KR | 10-2000-0063363 | | | 11/2000 | |
| KR | 10-2014-0047424 | | | 4/2014 | |
| KR | 10-1544668 | | | 8/2015 | |
| KR | 10-1563633 | | | 10/2015 | |
| KR | 10-1580271 | | | 12/2015 | |
| RU | 2156732 | | | 9/2000 | |
| WO | WO-2014153570 | A2 | * | 9/2014 | B01D 3/06 |
| WO | WO-2020046229 | A2 | * | 3/2020 | C01B 32/914 |

OTHER PUBLICATIONS

Fedotov et. al Functional Materials for Radioactive Waste Management. Nanotechnol Russia 13, 578-584 (Year: 2019).*

Budak, Erhan, et. al, "Recycling of hazelnut shell: Synthesis of boron carbide by carbothermic reaction." Proc. Int. Conf. Radiat. Appl. vol. 4. 2019 (Year: 2019).*

Matsuo, Toshiaki, and Takashi Nishi. "Activated carbon filter treatment of laundry waste water in nuclear power plants and filter recovery by heating in vacuum." Carbon 38.5 (2000): 709-714 (Year: 2000).*

Choong-Hwan Jung et al., "Preparation of carbon-free B4C powder from B2O3 oxide by carbothermal reduction process", Materials Letters, vol. 58, Issue 5, 2004, pp. 609-614, ISSN 0167-577X, Feb. 2004.

A. K. Suri, C. Subramanian et al., "Synthesis and consolidation of boron carbide: a review", International Materials Reviews, 55:1, 4-40, DOI: 10.1179/095066009X12506721665211, Jan. 2010.

A. Alizadeh et al., "Synthesis of boron carbide powder by a carbothermic reduction method", Journal of the European Ceramic Society, vol. 24, Issues 10-11, 2004, pp. 3227-3234, ISSN 0955-2219, https://doi.org/10.1016/j.jeurceramsoc.2003.11.012, Sep. 2004.

Tomohiro Kobayashi et al., "Effects of heattreatment temperature and starting composition on morphology of boron carbide particles synthesized by carbothermal reduction", Ceramics International, vol. 39, Issue 1, (2013), pp. 597-603, ISSN 0272-8842, Jan. 2013.

INPI, Preliminary Search Report of French Patent Application No. 2113585, dated Jul. 17, 2023.

K. W Lee et al, "Development of the new process for radioactive borated liquid waste treatment using forward osmosis technology", KAERI, KAERI/RR-3733/2013, Aug. 2014 (along with its English Abstract).

* cited by examiner

NEUTRON ABSORBER SYNTHESIS SYSTEM

BACKGROUND OF THE INVENTION

(a) Field of the Invention

A neutron absorber synthesis system is provided.

(b) Description of the Related Art

Various types of waste are generated in liquid waste treatment systems from nuclear power plants. The liquid waste of a primary cooling water system is generated by controlling a concentration of boric acid in the cooling water and leakage, etc., and 0.3-0.8 wt % of boric acid is contained in this liquid waste. In order to increase the concentration of boric acid in the waste fluid, the waste fluid may be changed to a dried powder state by evaporating moisture from the waste fluid and mixing hydrated lime with the waste fluid. Currently, the treated liquid waste is stored in a dried powder state in the nuclear power plants, and in order to dispose of such waste of the dried powder state, there is a method of mixing the dried powder of the boric acid waste fluid with cement and disposing of it in a solid form.

According to a conventional art, there are methods of storing and disposing boric acid waste fluid as a polymer solid or a cement solid, and using a high integrity container (HIC), but these methods may generate a large amount of waste.

As a related prior document, Japanese Patent No. 4,152,562 discloses "solidify material and neutron absorber of high concentration boric acid water solution".

SUMMARY OF THE INVENTION

An embodiment is to provide a neutron absorber synthesis system that can synthesize boron carbide that is a raw material for a neutron absorber, by recycling boron (B-10) of a mass number of 10 that can absorb boron, particularly neutrons existing in boric acid waste fluid.

The present invention can be used to achieve other effects that are not described in detail in addition to the aforementioned effects.

A neutron absorber synthesis system according to an embodiment includes: a pre-processing unit to which a radioactive waste including boron is supplied from the outside and inflows to the inside and a compound is produced by removing moisture of the radioactive waste by heat treatment by a first heat source; and a boron carbide synthesizing unit to which the compound produced from the radioactive waste is inflowed inside and a boron carbide is synthesized from a raw material containing the compound and carbon by heat treatment by a second heat source.

According to an embodiment, by synthesizing boron carbide by recycling boron present in the boric acid waste fluid discharged as the radioactive waste, the radioactive waste generation may be reduced, and basic materials necessary for a nuclear power industry may be produced simultaneously.

DETAILED DESCRIPTION OF THE EMBODIMENTS

Figure 1:
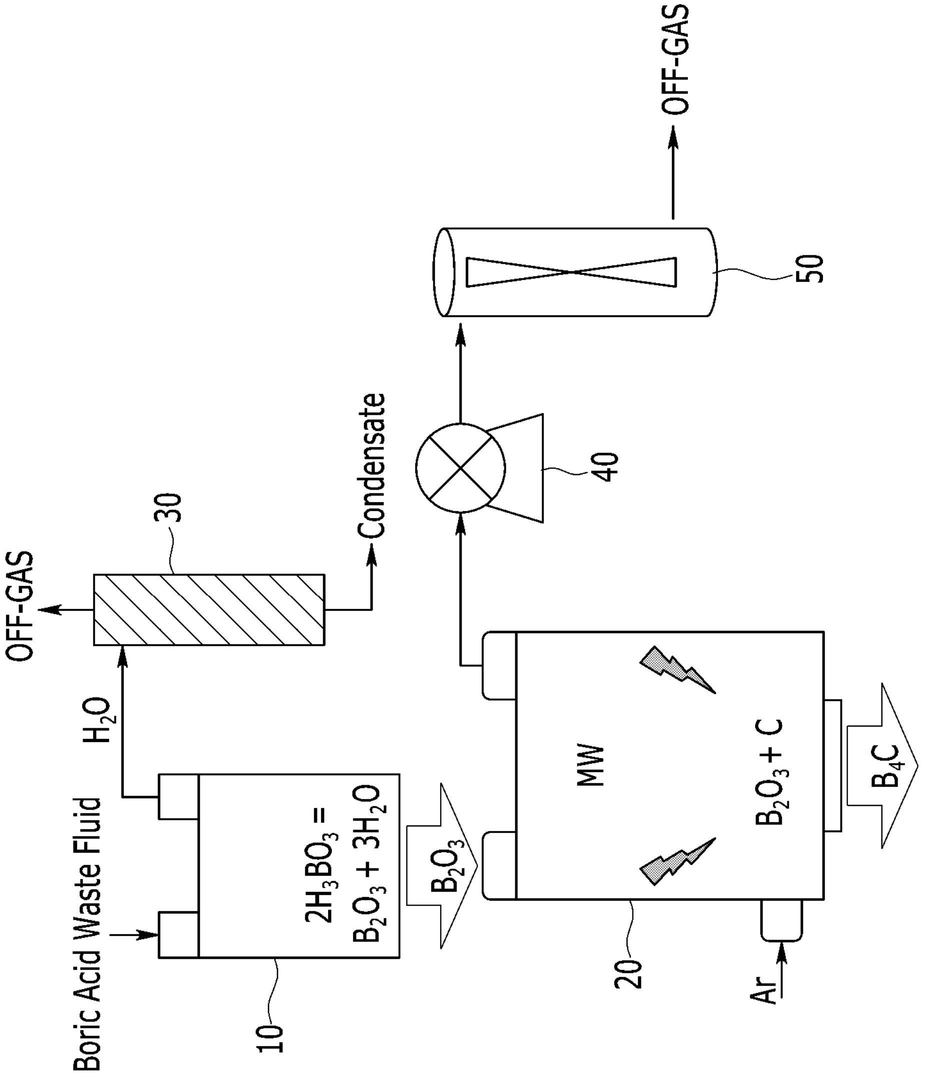
FIG. 1 is a view showing a boron carbide synthesis processing using a neutron absorber synthesis system according to an embodiment.

The present invention will be described more fully hereinafter with reference to the accompanying drawings, in which embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. In addition, the detailed description of the widely known technologies will be omitted.

In addition, unless explicitly described to the contrary, the word "comprise", and variations such as "comprises" or "comprising", will be understood to imply the inclusion of stated elements but not the exclusion of any other elements.

Hereinafter, a neutron absorber synthesis system is described in detail with reference to accompanying drawings.

FIG. 1 is a view showing boron carbide synthesis processing using a neutron absorber synthesis system according to an embodiment. Referring to FIG. 1, a neutron absorber synthesis system includes a pre-processing unit 10, a boron carbide synthesizing unit 20, a moisture processing unit 30, and a carbon monoxide removal unit 50. This neutron absorber synthesis system may synthesize boron carbide ($B_4C$) of a neutron absorber by using a boric acid waste fluid ($H_3BO_3$) of liquid radioactive waste generated in nuclear power plants. Here, the radioactive waste may include one or more of a boric acid waste fluid and a dried powder ($Na_2B_4O_7.10H_2O$).

The radioactive waste containing boron is inflowed into the pre-processing unit 10 from the outside. The pre-processing unit 10 may produce a compound by removing the moisture of the radioactive waste by a first heat treatment condition of the first heat source. The first heat source may include a conventional furnace or a microwave. By using the microwave as the first heat source, the moisture may be continuously and uniformly removed from the radioactive waste. Here, the heat treatment condition using the first heat source may be a condition for performing a heat treatment with the first heat source for a first predetermined time at a first predetermined temperature. For example, the first predetermined temperature may be about 50-500° C., and the first predetermined time may be about 30 minutes or more. In both methods using the first heat source, the pre-processing temperature may be based on the raw material, and the heat treatment may be performed for about 30 minutes or more at the temperature of about 50-500° C. For example, the first predetermined temperature for the moisture removal of the radioactive waste in the pre-processing unit 10 may be set to a temperature within the range of about 50-500° C. When the first predetermined temperature is higher than about 500° C., there is a possibility of radioactive waste fusion, and when the first predetermined temperature is lower than about 50° C., the moisture removal efficiency may deteriorate. The compound produced in the pre-processing unit 10 may include at least one of diboron trioxide ($B_2O_3$) or a mixture of sodium oxide ($Na_2O$) and diboron trioxide.

Through the pre-processing unit 10, the compound produced from the radioactive waste is inflowed into the boron carbide synthesizing unit 20. In addition, a raw material including carbon is supplied into the boron carbide synthesizing unit 20. For example, the raw material including carbon is activated carbon, a polymer, sugars, etc. The activated carbon may be considered as the most suitable carbon raw material, and the activated carbon may be a raw material in which radioactive nuclides are removed from the waste activated carbon of the radioactive waste. That is, the radioactive waste activated carbon generated from nuclear power plants may be supplied into the boron carbide synthesizing unit 20 after undergoing a process to remove the radioactive nuclides such as carbon (C-14) and deuterium (H-3) contained in the waste activated carbon. The boron carbide synthesizing unit 20 may synthesize the boron carbide from the diboron trioxide and the carbon raw material under the heat treatment condition of the second heat source. The second heat source may include microwaves. By using microwaves as the second heat source, the boron carbide may be synthesized continuously and uniformly. Here, the heat treatment condition using the second heat source may be a condition for performing a heat treatment with the second heat source for a second predetermined time at a second predetermined temperature. For example, the second predetermined temperature may be about 1600-2000° C., and the second predetermined time may be about 1 hour-4 hours. The heat treatment condition using the second heat source may include one or more conditions among an inactive atmosphere of an inert gas and a condition to maintain a vacuum state. Here, the inert gas may include one or more of argon (Ar) and or nitrogen ($N_2$). In the case of the boron carbide synthesis process using the boron carbide synthesizing unit 20, by using the microwave, the boron carbide may be synthesized at a predetermined temperature (about 1600-2000° C.) that is relatively lower than the temperature (about 2000° C. or more) of the conventional heat treatment method within a relatively faster time (1-4 hours). Here, during high temperature heat treatment, the atmosphere of the boron carbide synthesizing unit 20 may be maintained in an inactive atmosphere (argon (Ar) or nitrogen $N_2$) or a vacuum state.

During the boron carbide synthesis reaction, a large amount of carbon monoxide (CO) and dioxide carbon ($CO_2$) are generated. The gas thus generated is transferred to a carbon monoxide removal unit 50 through a vacuum pump 40, and may be discharged in the form of dioxide carbon ($CO_2$). The sodium oxide may be volatilized when being heat-treated above about 1950° C., and impurities may exist at a temperature below that. The boron carbide finally synthesized through the boron carbide synthesizing unit 20 may be recovered through a separate recovery route.

The moisture processing unit 30 is connected to the pre-processing unit 10, the pre-processed moisture in the pre-processing unit 10 is inflowed, and the moisture may be processed. The moisture generated in the pre-processing process may be condensed in a moisture processing unit 30, which is separately provided for moisture condensation. The condensate collected in the moisture processing unit 30 may be transported separately to the radioactive liquid waste treatment process.

The carbon monoxide (CO) and the carbon dioxide ($CO_2$) generated during in the synthesis reaction of the boron carbide through the boron carbide synthesizing unit 20 is supplied to the carbon monoxide removal unit 50. The carbon monoxide removal unit 50 may guide the removal of the carbon monoxide and the discharge of the carbon dioxide. The carbon monoxide removal unit 50 may be formed in a tower shape for removing the carbon monoxide by oxidation. A vacuum pump 40 may be provided between the boron carbide synthesizing unit 20 and the carbon monoxide removal unit 50, and the vacuum pump 40 may guide the flow of carbon monoxide and carbon dioxide.

As described above, the neutron absorber synthesis system according to an embodiment may include the pre-processing unit that removes the moisture remaining in the boric acid waste fluid, the boron carbide synthesizing unit that synthesizes the boron carbide by using the microwave as the heat source, the moisture processing unit including the condenser for the moisture condensation, and the carbon monoxide removal unit that removes carbon monoxide (CO) generated during the boron carbide synthesis. And the neutron absorber synthesis system may synthesize a neutron absorber by using the boric acid waste fluid which is the radioactive waste or the boric acid waste dried powder of the concentrated state. Here, the neutron absorber may include boron carbide ($B_4C$). For example, boric acid waste fluid ($H_3BO_3$), which is the liquid radioactive waste generated in nuclear power plants, may be used to produce the boron carbide, which is the raw material that is useful as the neutron absorber.

Figure 2:
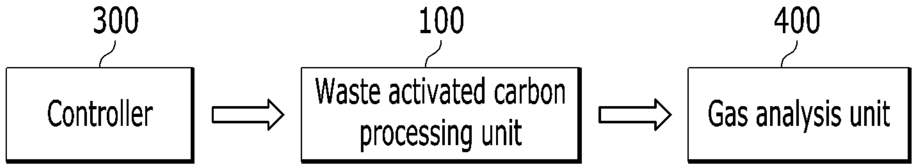
FIG. 2 is a block diagram showing a radioactive waste activated carbon processing control device.
Figure 3:
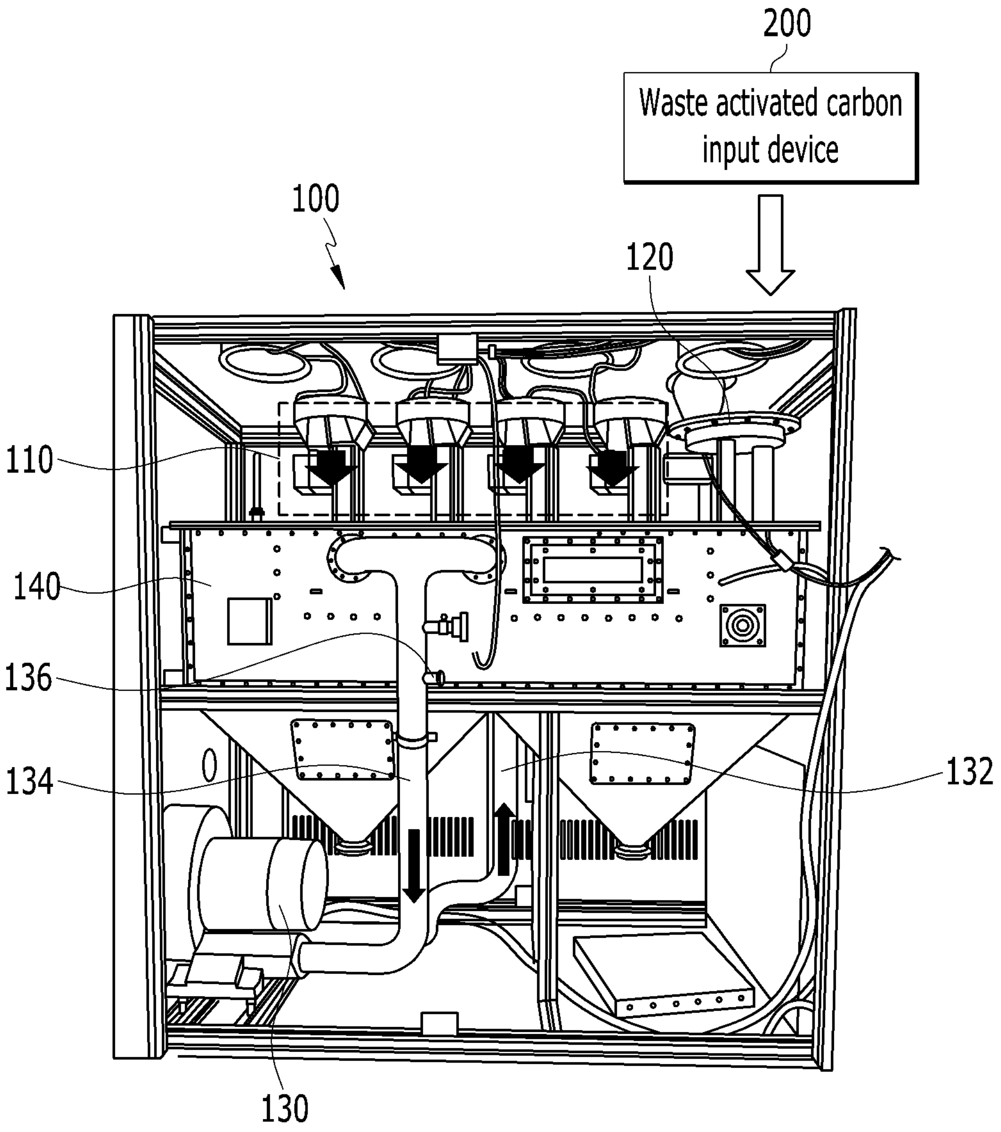
FIG. 3 is a view showing a waste activated carbon processing unit.
Figure 4:
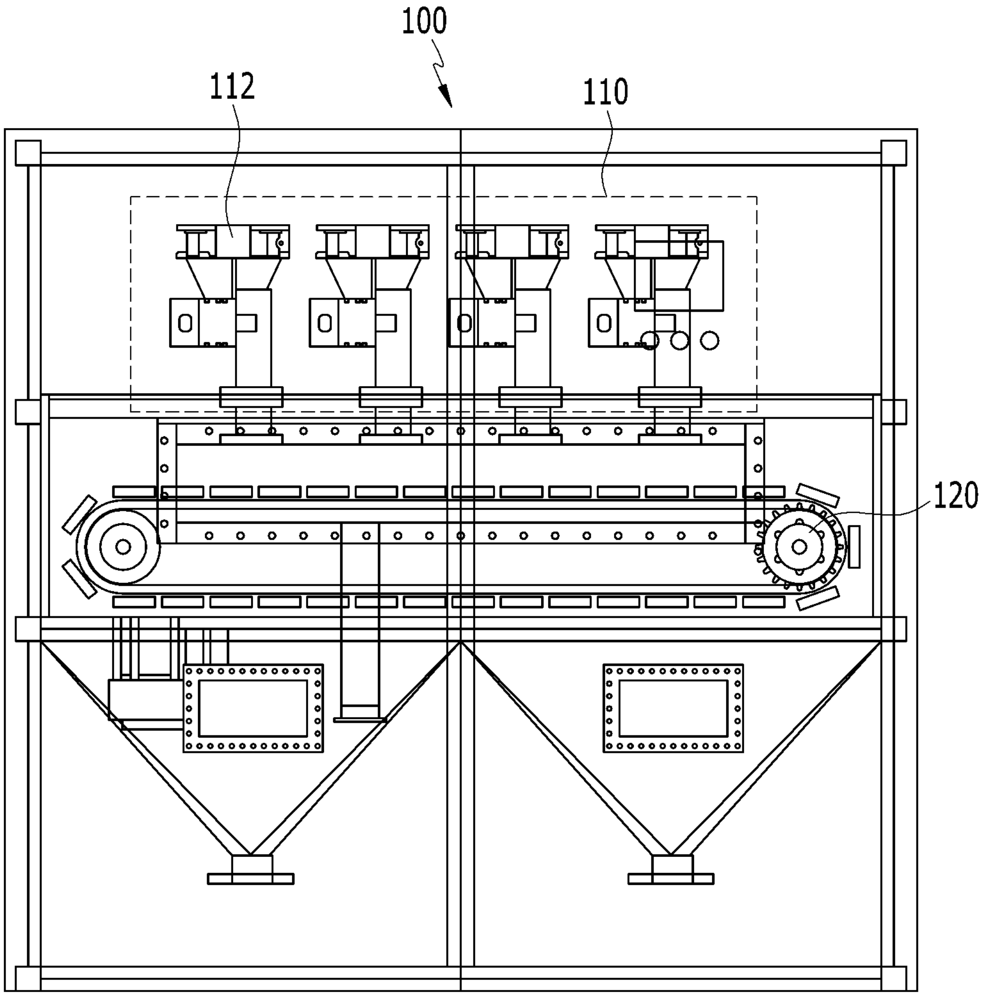
FIG. 4 is a view showing an inside of a waste activated carbon processing unit.

FIG. 2 is a block diagram showing a radioactive waste activated carbon processing control device, FIG. 3 is a view showing a waste activated carbon processing unit, and FIG. 4 is a view showing the inside of a waste activated carbon processing unit.

Referring to FIG. 2 to FIG. 4, the activated carbon, the polymer, the sugars, etc. may be used as the carbon raw material supplied to the neutron boron carbide synthesizing unit 10 of FIG. 1. In addition, when the activated carbon is used, the treated radioactive waste activated carbon may be used. The treated radioactive waste activated carbon may be the activated carbon from which impurities such as radioactive nuclides have been removed through the radioactive waste activated carbon processing control device.

The radioactive waste activated carbon processing control device includes a waste activated carbon processing unit 100, a gas analysis unit 400, and a controller 300. By analyzing the exhaust gas generated in the waste activated carbon processing unit 100 in the gas analysis unit 400, the processing state of the waste activated carbon may be analyzed. By using the exhaust gas information analyzed by the gas analysis unit 400, the controller 300 may control the processing temperature and the processing time of the waste activated carbon by adjusting the microwave power and the speed of a conveyor belt. Accordingly, C-14 and H-3 nuclides contained in the waste activated carbon may be collected without external leakage. In addition, since the radioactive waste activated carbon processing control device is mounted to be movable at the rear end of various organic wastes, secondary waste may be minimized.

The waste activated carbon processing unit 100 may transfer the waste activated carbon supplied from an external waste activated carbon input device 200 to the microwave reaction section to heat-treat the oxidation of the waste activated carbon with the microwave.

The gas analysis unit 400 may analyze the exhaust gas generated from the waste activated carbon processing unit 100 to monitor the processing state of the waste activated carbon in real time and produce the analyzed exhaust gas information. The gas analysis unit 400 may include a discharge gas filtering unit and a gas analysis unit 400. The discharge gas filtering unit may function to remove moisture and other gases excluded from the analysis target existing in the discharge gas. The gas analysis unit 400 includes a gas chromatograph.

According to the conventional waste activated carbon processing technology, if excessive processing is performed during the radioactive waste activated carbon processing, a large amount of secondary waste (a gas) containing radioactive nuclides may be generated. In addition, if the waste activated carbon treatment process is not sufficiently performed, the waste cannot be treated to below a regulation.

However, in the waste activated carbon processing technology according to an embodiment, by using the method for controlling the temperature of the waste activated carbon through the speed of the conveyor belt and the microwave control, the process may be controlled so that C-12 of the waste activated carbon is not generated in the form of carbon dioxide while removing C-14.

In the radioactive waste activated carbon processing process, since the properties of the material are not uniform due to the nature of the waste, the discharge gas generated when the radioactive waste activated carbon is processed in the waste activated carbon processing unit 100 may be analyzed. The gas analysis unit 400 may monitor the discharge gas discharged from the waste activated carbon processing unit 100 in real time. The gas analysis unit 400 may analyze the discharge gas discharged from the waste activated carbon processing unit 100 to analyze the state of the waste activated carbon processing in the radioactive waste activated carbon processing process. The gas analysis unit 400 may extract a discharge gas sample from the waste activated carbon processing unit 100 to analyze the generated gas such as carbon dioxide ($CO_2$), nitrogen oxide (NOx), ammonia ($NH_3$), etc. During the normal operation of the radioactive waste activated carbon processing control device, a certain level of carbon dioxide (including $CO_2$ and other gases) is present in the discharge gas and gradually increases. Under specific circumstances, the generation of the gas to be analyzed may increase rapidly. Here, the specific circumstances may mean a situation in which not only the surface oxidation of the waste activated carbon occurs but also a situation in which the waste activated carbon itself is combusted as the temperature is rapidly increased. When the analysis target gas is rapidly generated, the controller 300 may stabilize the process by adjusting the microwave power. The controller 300 may analyze the waste activated carbon processing analysis information supplied from the gas analysis unit 400 to be reflected to the radioactive waste activated carbon processing process in real time.

The controller 300 analyzes the discharge gas information transmitted through the gas analysis unit 400 and controls microwave irradiation and the transfer of the waste activated carbon to separate the radioactive nuclides remaining in the waste activated carbon and to produce a waste activated carbon processing control signal, thereby it is possible to control the processing process of the waste activated carbon. The controller 300 uses processing by a processor of an information processing device and refers to a logical part of a program that performs a specific function in a computer, and may be implemented in software, hardware, etc. For example, the information processing device includes a personal computer, a handheld computer, a personal digital assistant (PDA), a mobile phone, a smart device, a tablet, and the like. In addition, the controller 20 may be provided with a separate storage unit for storing data related to the waste activated carbon processing. The storage unit is a device that stores a control and information processing algorithm related to the waste activated carbon processing, and related data and programs, and may include various types of memory such as non-volatile memories, including a high-speed random access memory, magnetic disk storage, flash memory devices, and other non-volatile solid-state memory devices.

The waste activated carbon processing unit 100 may include a main body part 140, a microwave heat treatment part 110, and a conveyor belt transporting part 120. In the waste activated carbon processing unit 100, a temperature sensor may be provided at a position necessary to measure a change in temperature generated during the processing of the waste activated carbon.

The main body part 140 includes an input part 120 of the waste activated carbon supplied from the outside and an exhaust part for discharge after treatment, and may be formed of a closed and sealed structure to prevent leakage of radioactive nuclides.

The microwave heat treatment part 110 is provided in the microwave reaction section in the main body part 140, and may perform the heat treatment by irradiating the microwave to waste activated carbon. The microwave heat treatment part 110 may be formed of the closed and sealed structure as a whole. Here, the microwave reaction section may be provided in plurality along the transfer section of the waste activated carbon. The microwave heat treatment part 110 may include a chamber 112 for irradiating a corresponding microwave corresponding to a plurality of microwave reaction sections, respectively. By using the microwave generated from the microwave heat treatment part 110, the entire waste activated carbon is instantaneously heated, so that C-14 and H-3 deposited on the surface of the waste activated carbon may be removed with a form of the carbon dioxide ($CO_2$) and water ($H_2O$). In the case of the indirect heating from the heat source, C-14 in micropores is carbonized and is fixed to the waste activated carbon, whereas in the case of the direct heating through the microwave heat treatment part 110, the adsorbed C-14 may be removed without a carbonization time of below a regulation level.

The conveyor belt transporting part 120 may be provided on the transporting section of the waste activated carbon to transfer the waste activated carbon to the microwave reaction section. The conveyor belt transporting part 120 includes a conveyor belt and a driving unit. The conveyor belt transporting part 120 is driven according to the waste activated carbon processing control signal of the controller 20, so that the transport speed of the waste activated carbon may be adjusted. A continuous process is possible because the continuous movement and the speed of the waste activated carbon supplied from the outside may be controlled by using the conveyor belt transporting part 120. The generation of the secondary gas waste may be minimized by controlling the temperature of waste activated carbon through the speed of the conveyor belt and the driving control of the microwave heat treatment part 110 to prevent C-12 of the waste activated carbon from being generated in the form of the carbon dioxide while removing C-14.

An air circulation unit connected to the main body part 140 by an air circulation line to supply an air to the main body part 140 and processing the discharge gas discharged from the main body part 140 may be further included. The air circulation unit may include an air supply unit 130 for guiding the air circulation, an inflow line 132, and an exhaust line 134. The air supply unit 130 may include a blower motor and a blower fan for generating a circulating flow of air. The inflow line 132 may be connected to the air supply unit 130 and the main body part 140 to guide the flow of air supplied to the main body part 140. Separately from the inflow line 132, a gas input line for inputting the corresponding gas to the main body part 140 may be provided. Here, a content of oxygen supplied through the gas input line may be set to 0-30%. The exhaust line 134 may be connected to the air supply unit 130 and the main body part 140 to guide the flow of the discharge gas discharged from the main body part 140. The discharge gas discharged through the exhaust line 134 may be transferred to and processed by a separate discharge gas processing device, or may be cyclically connected to the discharge gas processing device and processed simultaneously when the waste activated carbon is processed. The waste activated carbon processing unit 100 may further include a discharge gas extraction unit 136 provided in the exhaust line 134 to guide the flow of the discharge gas supplied to the gas analysis unit 400.

Here, the inflow line 132 and the exhaust line 134 may be interlocked with a discharge gas processing device including a two-step radioactive discharge gas circulation line. For example, according to the discharge gas processing device, the radioactive discharge gas of which the carbon C-14 is partially removed in the first adsorption unit is transferred through a circulation line, and the adsorption process is additionally performed by an adsorption agent in the second adsorption unit, so that carbon C-14 may be further removed. The radioactive discharge gas additionally adsorbed from the second adsorption unit may be recirculated through a return line. According to the recirculation process of this radioactive discharge gas, the removal efficiency of carbon C-14 contained in the radioactive waste may be increased.

The waste activated carbon processing unit 100 may be formed in a closed and sealed structure as a whole to prevent leakage of the radioactive nuclides in relation to the waste activated carbon processing. Accordingly, the waste activated carbon processing unit 100 may collect C-14 and H-3 nuclides without external leakage in connection with the various radioactive waste processing devices, and in the case of C-14, it may be captured to be recycled or processed in a stable form. In addition, the waste activated carbon processing unit 100 may be formed as a mobile module. Here, the movable module may be provided to include the waste activated carbon processing unit 100 in a separate case, and may be formed in a structure including wheels having an easy-to-move structure in the lower part of the case. As the waste activated carbon processing unit 100 is provided as the mobile module, the waste activated carbon processing unit 10 may be moved freely, and the secondary waste may be minimized by being movably mounted at the rear end of various organic radioactive waste processing devices.

Next, a neutron absorber manufacturing method is described in detail.

The boron carbide synthesis process using the neutron absorber synthesis system according to an embodiment is described with reference to FIG. 1. The pre-processing process and the boron carbide synthesis process using the pre-processing unit 10 and the boron carbide synthesizing unit 20 in the boron carbide synthesis device utilizing the radioactive waste are mainly described. Here, as the radioactive waste, boric acid waste fluid ($H_3BO_3$) may be utilized. By using the neutron absorber synthesis system using boric acid waste fluid, boron (B), which is a useful element contained in the boric acid waste fluid, may be used to synthesize boron carbide of the neutron absorber used in a nuclear power industry. In the case of boron carbide, it is used as a poison rod to absorb neutrons in nuclear power plants, or as a neutron absorber to control the temperature of a nuclear fuel after usage. Accordingly, when using the recycled boron carbide, new waste may be reduced by preventing an inflow of a new material. Also, when treating the nuclear fuel after the usage, the recycled boron carbide may be used as the neutron absorber, so it is highly economical.

First, there is a pre-processing process to remove moisture from the boric acid waste fluid supplied to the inside of the pre-processing unit 10. In the pre-processing process using the pre-processing unit 10, moisture remaining in the target radioactive waste may be removed. As a heat source used at this time, a conventional furnace or microwave (MW) may be used.

$$2H_3BO_3 \longrightarrow B_2O_3 + 3H_2O$$

$$Na_2B_4O_7{\cdot}10H_2O \longrightarrow Na_2O + 2B_2O_3 + 10H_2O$$

The pre-processing temperature is about 50-500° C.

Next, there is a process of synthesizing boron carbide by using the microwave as a heat source in the boron carbide synthesizing unit 20. After removing moisture in the pre-processing process, diboron trioxide ($B_2O_3$) or a mixture of sodium oxide ($Na_2O$) and diboron trioxide may be obtained. Here, by inputting the produced compound as a boron carbide synthesis reactor, boron carbide may be synthesized.

$$B_2O_3 + C \longrightarrow B_2O_3 + CO$$

$$B_2O_3 + C \longrightarrow 2BO + CO$$

$$B_2O_3 + 3CO \longrightarrow 2B + 3CO_2$$

$$4B + C \longrightarrow B_4C$$

The boron carbide synthesizing unit processing temperature is about 1600-2000° C., and the synthesis reaction may proceed in argon (Ar) or vacuum environments.

As described above, the neutron absorber synthesis system according to an embodiment may produce boron carbide, which is a useful raw material, by utilizing the boric acid waste fluid, which is a radioactive waste. In addition, boron carbide may be synthesized in a short time at a relatively low temperature compared to the conventional boron carbide synthesis method by using the microwave. In the case of boron carbide synthesized through the boron carbide synthesizing unit, it may be utilized in the process of utilizing a neutron absorber in the nuclear power industry. In addition, the synthesized boron carbide may be used in a disposal container as a neutron absorber when disposing of the nuclear fuel after the usage. Accordingly, by limiting the inflow of a new material, it is possible not only to reduce the amount of the radioactive waste by utilizing the current radioactive waste, but also to limit the radioactive waste that may occur in the future.

The activated carbon supplied to synthesize boron carbide may be the processed waste activated carbon, and the operation of the processing control device of such waste activated carbon is now described in detail.

In the waste activated carbon processing unit 100, a uniform amount of waste activated carbon may be input to the conveyor belt from the waste activated carbon input device 200 through the input part 120 provided on the upper side of the main body part 140. In the case of the waste activated carbon, it may be input directly onto the conveyor belt or into a crucible of a specific size. At this time, the input waste activated carbon may be accumulated to a height of about 20 mm or less. The input waste activated carbon is transferred to the microwave reaction section along the conveyor belt. The controller 300 controls oxidation of the waste activated carbon by controlling the speed of the conveyor belt and the microwave in the microwave reaction section. At this time, a gas having an oxygen content of about 0-30 may be supplied to satisfy the oxidation condition. Depending on the material and a functional group deposited on the waste activated carbon, an appropriate oxidation temperature may be crystallized. Here, the oxidation temperature may be set in the range of about 300° C.-700° C. After short processing within about 10 minutes, the waste activated carbon that has been processed from the end of the conveyor belt to the exhaust part at the bottom may be accumulated. And, after the internal discharge gas is removed, the treated waste activated carbon may be discharged through the exhaust part to the outside. In the case of the discharge gas, the discharge gas may be continuously processed during the operation in connection with the discharge gas processing device. If necessary, nuclides in the discharge gas may be removed through gas circulation with a closed and sealed type of discharge gas processing device.

Table 1 shows changes in weight and temperature of the waste activated carbon (TEDA-deposited waste activated carbon) according to an operating time when the waste activated carbon is processed in the waste activated carbon processing unit 100.

TABLE 1

| Waste activated carbon | 330 seconds | 660 seconds | 990 seconds | 1120 seconds | 1150 seconds | 1180 seconds | 2205 seconds | 2230 seconds | 2250 seconds | 2275 seconds | 3300 seconds |
|---|---|---|---|---|---|---|---|---|---|---|---|
| 10 g | 99.97 g<br>— | 99.6 g<br>3345° C. | 99.57 g<br>— | 99.36 g<br>3390° C. | 99.5 g<br>4400° C. | 99.46 g<br>4419.3° C. | 99.35 g<br>4480° C. | 99.08 g<br>4443° C. | 99.1 g<br>4480° C. | 99.1 g<br>4426° C. | 99.08 g<br>6600° C. |
| 20 g | 119.53 g<br>990.8° C. | 119.18 g<br>1144° C. | 118.76 g<br>2255° C. | 118.32 g<br>3340° C. | 118.47 g<br>3382° C. | 117.9 g<br>4402° C. | 118.3 g<br>3372° C. | 117.47 g<br>4415° C. | 117.45 g<br>4430° C. | 117.33 g<br>4430° C. | 117.34 g<br>5501° C. |

Referring to Table 1, it may be seen that the weight of the input waste activated carbon decreases as the processing time of the waste activated carbon processing unit 100 passes, and decreases as the processing temperature increases.

The waste activated carbon is transferred to the microwave reaction section by using the conveyor belt, and the radioactive waste of the waste activated carbon may be treated by irradiating the microwave from the microwave heat treatment part 110 provided in the microwave reaction section. When the waste activated carbon is continuously transferred to the microwave reaction section by driving the conveyor belt transporting part 120, the microwave heat treatment part 110 may individually irradiate the microwaves to the waste activated carbon from a plurality of chambers 112. Accordingly, the waste activated carbon in which the radioactive nuclides remain in the waste activated carbon may be separated and treated may be dried. The microwave heat treatment part 110 may be operated while changing the frequency, the output, and the temperature in each chamber 112. Accordingly, the microwave heat treatment part 110 may perform the heat treatment in an appropriate manner according to the condition of the waste activated carbon supplied to the inside of the microwave heat treatment part 110 through a separate inlet.

In the process of the waste activated carbon moving through the conveyor belt, only C-14 present on the waste activated carbon surface under a specific condition may be oxidized and treated. In the case of the waste activated carbon that comes out as the radioactive waste, H-3 is collected in the form of moisture, and in the case of C-14, it exists in the form of the organic material on the surface. According to the waste activated carbon processing control device, by controlling the gas atmosphere with the monitoring through the microwave output control (the temperature), the conveyor belt speed control (the processing time), and the real-time analysis of the discharge gas, the entire waste activated carbon treatment process may be operated more stably, and the treatment for the partial oxidation of the surface of the waste activated carbon may be performed. If the partial surface oxidation is not performed, there is a possibility that nuclides may not be properly removed or a large amount of the gas waste may be generated due to a large part of the incineration.

Hereinafter, the present invention is described in more detail by providing an example, but the following example is only an embodiment of the present invention, and the present invention is not limited to the following example.

EXAMPLE

Figure 5:
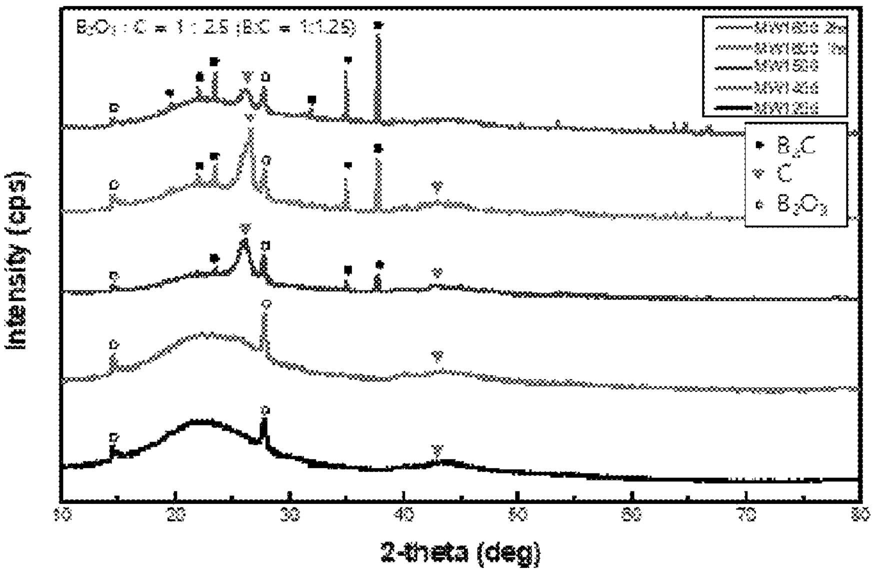
FIG. 5 is an XRD graph of a boron carbide produced according to various synthesis reaction conditions.

A boron carbide synthesis experiment using microwaves is progressed. Diboron trioxide and activated carbon are mixed in a weight ratio of about 1:2.5. An about 8 kW single magnetron (MW) is used. In the synthesis reaction, the reaction temperature is about 1200-1800° C., and the reaction time is about 1-2 hours. For example, the synthesis reaction is performed with the synthesis reaction condition of five types of 1) 1200° C. and 1 hour, 2) 1400° C. and 1 hour, 3) 1500° C. and 1 hour, 4) 1600° C. and 1 hour, and 5) 1600° C. and 2 hours. An XRD graph of boron carbide produced according to these five synthesis reaction conditions is shown in FIG. 5. Referring to FIG. 5, a crystal phase of boron carbide was not observed up to 1400° C., and boron carbide was produced from 1500° C. At the condition of 1600° C. and 2 hours, high purity boron carbide is synthesized.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A neutron absorber synthesis system comprising:

a pre-processing unit to which radioactive waste including boron is supplied from an outside and inflows to an inside and a compound is produced by removing moisture of the radioactive waste by heat treatment by a first heat source;

a boron carbide synthesizing unit to which the compound produced from the radioactive waste is inflowed inside and a boron carbide is synthesized from a raw material containing the compound and carbon by heat treatment by a second heat source; and a waste activated carbon processing unit treating a waste activated carbon into an activated carbon and supplying the activated carbon to the boron carbide synthesizing unit, wherein the waste activated carbon processing unit comprising:

a main body part including an input part of the waste activated carbon supplied from outside and an exhaust part for discharge after treatment, a microwave heat treatment part provided on a microwave reaction section in the main body part and irradiating a microwave to the waste activated carbon for heat treatment, a conveyor belt transporting part provided on a transporting section of the waste activated carbon and transporting the waste activated carbon to the microwave reaction section, wherein the boron carbide synthesizing unit receives the raw material including the activated carbon from the waste activated carbon processing unit, a controller adjusting a microwave power and a conveyor belt speed in the waste activated carbon processing unit, and a gas analysis unit analyzing an exhaust gas generated in the waste activated carbon processing unit, and wherein the controller is configured to control a processing temperature and a processing time of the waste activated carbon by adjusting the microwave power and the conveyor belt speed based on information of the exhaust gas analyzed by the gas analysis unit.

2. The neutron absorber synthesis system of claim 1, wherein the heat treatment condition of the first heat source is performed for a first predetermined time at a first predetermined temperature, the first predetermined temperature is 50-500° C., and the first predetermined time is 30 minutes or more.

3. The neutron absorber synthesis system of claim 1, wherein the heat treatment condition of the second heat source is performed for a second predetermined time at a second predetermined temperature, the second predetermined temperature is 1600-2000° C., and the second predetermined time is 1 hour-4 hours.

4. The neutron absorber synthesis system of claim 3, wherein the second heat treatment condition includes one or more of an inert gas inactive atmosphere and a vacuum condition.

5. The neutron absorber synthesis system of claim 4, wherein the inert gas includes one or more of argon (Ar) and/or nitrogen ($N_2$).

6. The neutron absorber synthesis system of claim 1, further comprising a moisture processing unit connected to the pre-processing unit and supplied and processed with moisture pre-processed in the pre-processing unit.

7. The neutron absorber synthesis system of claim 1, further comprising a carbon monoxide removal unit to which carbon monoxide (CO) and carbon dioxide ($CO_2$) generated during the boron carbide synthesis reaction through the boron carbide synthesizing unit are supplied and that guides the removal of the carbon monoxide and the discharge of the carbon dioxide.

8. The neutron absorber synthesis system of claim 7, further comprising a vacuum pump provided between the boron carbide synthesizing unit and the carbon monoxide removal unit and guiding a flow of the carbon monoxide and the carbon dioxide.

9. The neutron absorber synthesis system of claim 1, wherein the first heat source and the second heat source include a microwave.

10. The neutron absorber synthesis system of claim 1, wherein the radioactive waste includes one or more of boric acid waste fluid and/or dried powder.

11. The neutron absorber synthesis system of claim 1, wherein the compound includes one or more of diboron trioxide $B_2O_3$, or a mixture of sodium oxide ($Na_2O$) and diboron trioxide.

12. The neutron absorber synthesis system of claim 1, wherein the waste activated carbon processing unit transfers the waste activated carbon supplied from the outside to a microwave reaction section and heat-treats an oxide of the waste activated carbon by a microwave.

13. The neutron absorber synthesis system of claim 1, further comprising an air circulation unit for supplying air to the waste activated carbon processing unit and treating the discharge gas discharged from the waste activated carbon processing unit.

14. The neutron absorber synthesis system of claim 13, wherein the air circulation unit removes carbon C-14 from the discharge gas by a radioactive discharge gas circulation line in two steps.

* * * * *